United States Patent
Wang et al.

(10) Patent No.: US 10,976,728 B2
(45) Date of Patent: Apr. 13, 2021

(54) AUTOMATIC PROCESS PLANNING FOR ROBOTIC DEBURRING OPERATIONS

(71) Applicant: United Technologies Corporation, Farmington, CT (US)

(72) Inventors: Zhigang Wang, South Windsor, CT (US); Michael A. Klecka, Coventry, CT (US); Abhijit Chakraborty, West Hartford, CT (US); Changsheng Guo, South Windsor, CT (US); Jeffrey Michael Mendoza, Manchester, CT (US); Edward Marchitto, Canton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 219 days.

(21) Appl. No.: 16/214,982

(22) Filed: Dec. 10, 2018

(65) Prior Publication Data

US 2020/0183363 A1    Jun. 11, 2020

(51) Int. Cl.
*G05B 19/18* (2006.01)
*G05B 19/416* (2006.01)

(52) U.S. Cl.
CPC ........... *G05B 19/4163* (2013.01); *G05B 2219/36409* (2013.01); *G05B 2219/36495* (2013.01); *G05B 2219/45151* (2013.01)

(58) Field of Classification Search
USPC ............................................. 700/245–264
See application file for complete search history.

(56) References Cited

U.S. PATENT DOCUMENTS

| | | | | |
|---|---|---|---|---|
| 5,441,437 A * | 8/1995 | Hulstedt | ............... | B24B 17/00 451/1 |
| 5,548,194 A * | 8/1996 | Hamura | ............... | B25J 9/1684 318/568.1 |
| 5,761,390 A * | 6/1998 | Koshishiba | ............ | B25J 9/1679 700/250 |
| 7,534,077 B2 * | 5/2009 | Ban | .................... | G05B 19/4163 409/126 |
| 9,186,785 B2 | 11/2015 | Edsinger et al. | | |
| 9,186,795 B1 * | 11/2015 | Edsinger | ............... | B25J 9/1633 |
| 10,058,997 B1 * | 8/2018 | Chao | ..................... | B25J 9/1661 |
| 2006/0039768 A1 * | 2/2006 | Ban | .................... | G05B 19/4163 409/96 |

(Continued)

FOREIGN PATENT DOCUMENTS

EP      2821872 A1 *  1/2015  ............ B25J 9/1684
EP      2821872 B1     2/2017

OTHER PUBLICATIONS

Kruy, Sothea, Development of Burr Prediction System for End Milling, Graduate School of Science and Technology Keio University, Jul. 2015, 122 pages.

(Continued)

*Primary Examiner* — Jonathan L Sample
(74) *Attorney, Agent, or Firm* — Kinney & Lange, P. A.

(57) ABSTRACT

A robotic deburring process that automatically, accurately, and efficiently removes burrs from a workpiece. The robotic deburring process uses CAM location data to establish deburring trajectory, physics based machining models to predict burr type and size, and force control functions to compensate inaccuracies due of inaccuracies of robots arms.

20 Claims, 4 Drawing Sheets

(56) References Cited

U.S. PATENT DOCUMENTS

| | | | | |
|---|---|---|---|---|
| 2008/0140257 | A1* | 6/2008 | Sato | B25J 9/1638 |
| | | | | 700/258 |
| 2009/0125146 | A1* | 5/2009 | Zhang | B25J 9/1664 |
| | | | | 700/253 |
| 2009/0259412 | A1* | 10/2009 | Brogardh | B25J 9/1633 |
| | | | | 702/41 |
| 2010/0138030 | A1* | 6/2010 | Kohlmaier | G05B 19/401 |
| | | | | 700/173 |
| 2015/0019013 | A1* | 1/2015 | Rose | B25J 15/10 |
| | | | | 700/258 |
| 2015/0119753 | A1* | 4/2015 | Cosgrove | A61B 5/4064 |
| | | | | 600/562 |
| 2016/0031078 | A1* | 2/2016 | Kapoor | B25J 13/003 |
| | | | | 700/258 |
| 2017/0128136 | A1* | 5/2017 | Post | A61B 34/10 |
| 2018/0117764 | A1* | 5/2018 | Takeuchi | B25J 9/1633 |
| 2018/0161952 | A1* | 6/2018 | Gu | B25J 11/006 |
| 2018/0263704 | A1* | 9/2018 | Lang | A61B 34/74 |
| 2018/0361576 | A1* | 12/2018 | Sakai | G05B 13/027 |

OTHER PUBLICATIONS

Brogardh et al: "Present and future robot control development—An industrial perspective," Annual Reviews in Control, Pergamon, Amsterdam, NL, vol. 31, No. 1, Jan. 1, 2007 (Jan. 1, 2007), pp. 69-79, XP025319001, ISSN: 1367-5788, DOI: 10.1016/J.ARControl. 2007.01-002.

J.M. Stein et al: "Integrated Design and Manufacturing for Precision Mechanical Components" in: "Integrated Design and Manufacturing in Mechanical Engineering: Proceedings of the 1st IDMME Conference," Apr. 15, 1996 (Apr. 15, 1996), Springer Science & Business Media, Nantes, France, XP055697128, ISBN: 978-94-011-5588-5, pp. 367-376.

Techbriefs Media Group: "Software for Minimizing and Removing Burrs in Manufacturing," Apr. 1, 1999 (Apr. 1, 1999), XP055697134. Retrieved from the Internet: URL: https://www.techbriefs.com/component/content/articel/tb/techbriefs/manufacturing-prototyping/29786.

Aurich J C et al: "Burrs-Analysis, control and removal," CIRP Annals, Elsevier BV, NL, CH, FR, vol. 58, No. 2, Jan. 1, 2009 (Jan. 1, 2009), pp. 519-542, XP026770025, ISSN: 0007-8506, DOI: 10.1016/J.CIRP.2009.09.004.

Extended European Search Report for European Patent Application No. 19215024.1, dated Jun. 9, 2020, 15 pages.

* cited by examiner

AUTOMATIC PROCESS PLANNING FOR ROBOTIC DEBURRING OPERATIONS

BACKGROUND

The present disclosure relates to a robotic deburring process and, in particular, to the use of data to automate the robotic deburring process.

Burrs are small pieces of deformed material left on the edges of a workpiece during the finishing operation. Burr formation is a complicated process, which involves large plastic deformation of the workpiece material. The type of burr formed and its characteristics depend on many factors including, but not limited to, the machining process, tool properties, coolant properties, and workpiece material. In general, there are four basic types of burrs, the Poisson burr, roll-over burr, tear burr, and cut-off burr. Each type of burr requires a different deburring operation to effectively remove the burr.

Robot systems have become common in industry due to their low cost, flexibility, and versatility. But only very few robots have been adopted in high-value added material removal applications, such as deburring and polishing. The main issues with the use of robots in high-value added applications include: lack of absolute accuracy of the robot, insufficient stiffness of robot arm during machining, and time-consuming, expert-dependent programming processes.

SUMMARY

A deburring apparatus includes a robot including a robot arm, a deburring tool attached to the robot arm, a plurality of force sensors attached to the robot arm, and a controller in data communication with the robot. The controller is configured to predict burr characteristics on a workpiece using manufacturing data, calculate joint positions of the robot arm using computer aided manufacturing (CAM) data, and establish the deburring tool trajectory using the CAM data. Further, the controller communicates the joint positions of the robot arm and the deburring tool trajectory to the robot and the controller directs the motion of the robot during the removal of a burr on the workpiece, based on the prediction of the burr characteristics.

A method for controlling a robotic deburring process, the method comprising predicting, by a controller, burr characteristics on a workpiece using manufacturing data. Calculating, by the controller, joint positions of a robot arm using computer aided manufacturing (CAM) data. Establishing, by the controller, a trajectory of a deburring tool connected to the robot arm using the CAM data. Communicating the joint positions of the robot arm and the trajectory of the deburring tool from the controller to a robot. Directing, by the controller, the motion of the robot during the removal of a burr on a workpiece, based on the predicted burr characteristics.

DETAILED DESCRIPTION

Figure 1:
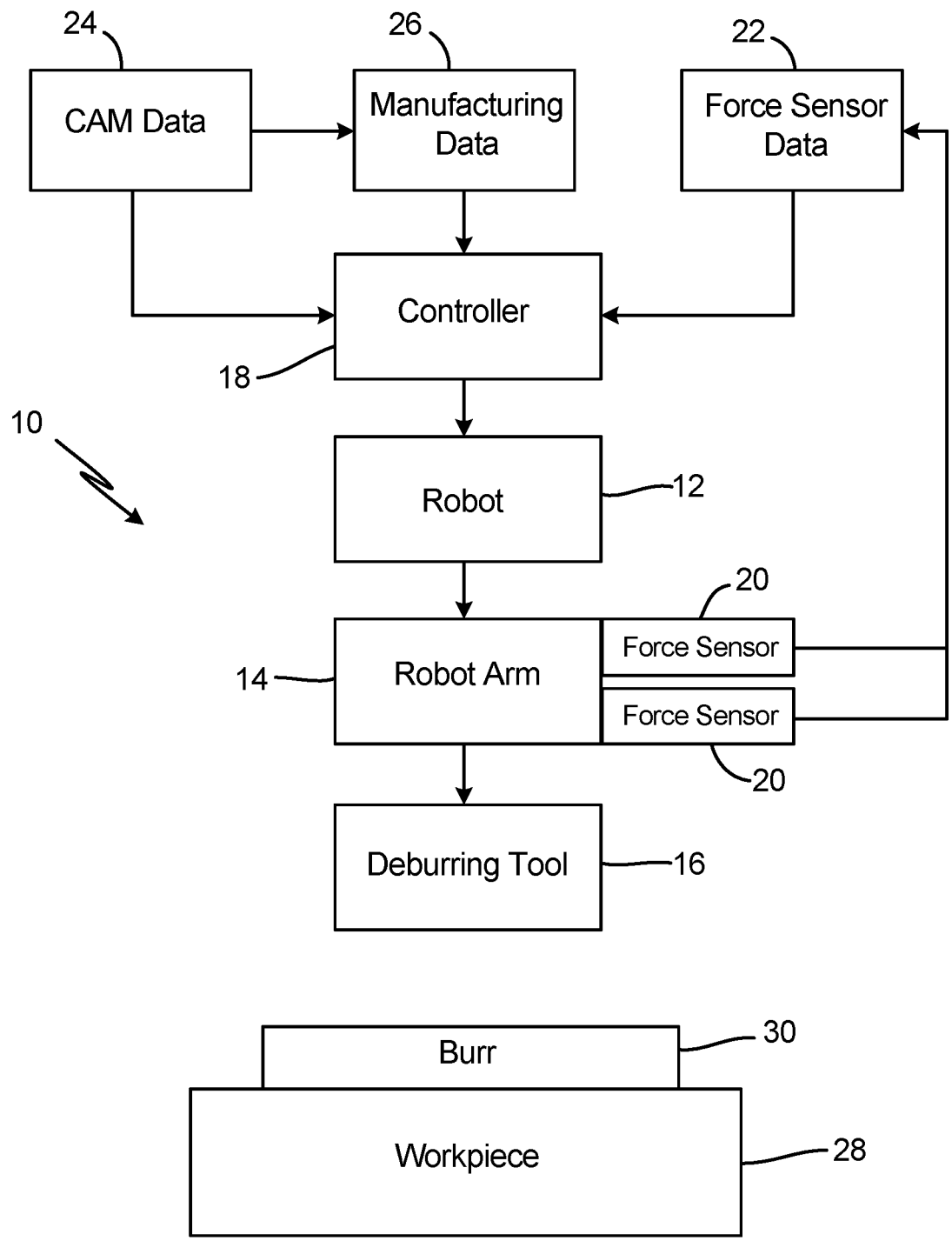
FIG. 1 is a schematic diagram of a robotic deburring apparatus.

FIG. 1 is a schematic diagram of robotic deburring apparatus 10, which includes robot 12, robot arm 14, deburring tool 16, and controller 18. Robot arm 14 includes force sensors 20 attached to robot arm 14, which produce force sensor data 22. Controller 18 receives, stores, and processes data, including force sensor data 22, computer aided manufacturing (CAM) data 24, and manufacturing data 26. FIG. 1 further illustrates workpiece 28 including burr 30.

Robot 12 is attached to and controls robot arm 14. Robot arm 14 is attached to and holds deburring tool 16. Robot arm 14 includes force sensors 20, which are attached to robot arm 14 and generate force sensor data 22 based on the movement of robot arm 14. Force sensors 20 can be positioned anywhere on robot arm 14, but in one embodiment force sensors 20 are positioned at the joints of robot arm 14. Deburring tool 16 is securely held by robot arm 14. Controller 18 is connected to and controls the movement of robot 12 through a wired connection, wireless connection, or any other known means. Controller 18 receives, stores, and processes force sensor data 22, CAM data 24, and manufacturing data 26.

Figure 2:
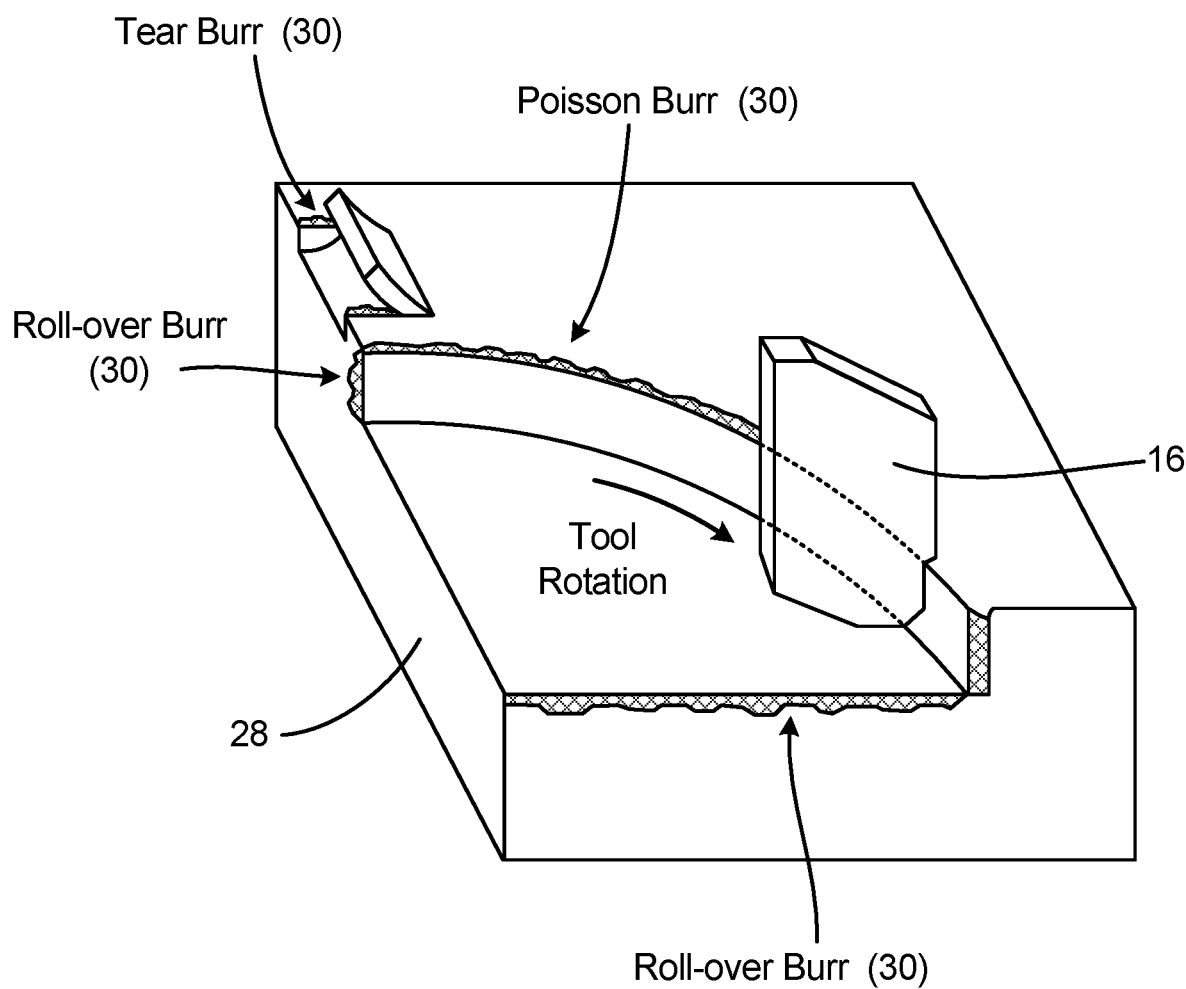
FIG. 2 is an illustration of potential burr formations.

FIG. 2 is an illustration of potential burr formations, including deburring tool 16, workpiece 28, and burrs 30. Workpiece 28 can be any object that is being worked on by robotic deburring apparatus 10. Burr 30 can be any type of burr that is generally known, but burr 30 will likely be one of a Poisson burr, a roll-over burr, a tear burr, or a cut-off burr. FIG. 2 illustrates a few types of burr 30 formations on workpiece 28, including a Poisson burr, a roll-over burr, and a tear burr. A Poisson burr is a burr that is formed when the machined material bulges outwards when the machining tool is applied to the workpiece under a downward pressure. A roll-over burr is typically produced when a cutting tool exits a material and the sharp tip of the tool pushes the material rather than cutting through or chipping it, thus creating the burr. A tear burr is created when material is torn away from a workpiece, rather than being sheared; this usually occurs during a punching or drilling process. A cut-off burr (not shown in FIG. 2) is produced when a portion of material falls away from the main workpiece, tearing it and leaving behind a burr.

Figure 3:
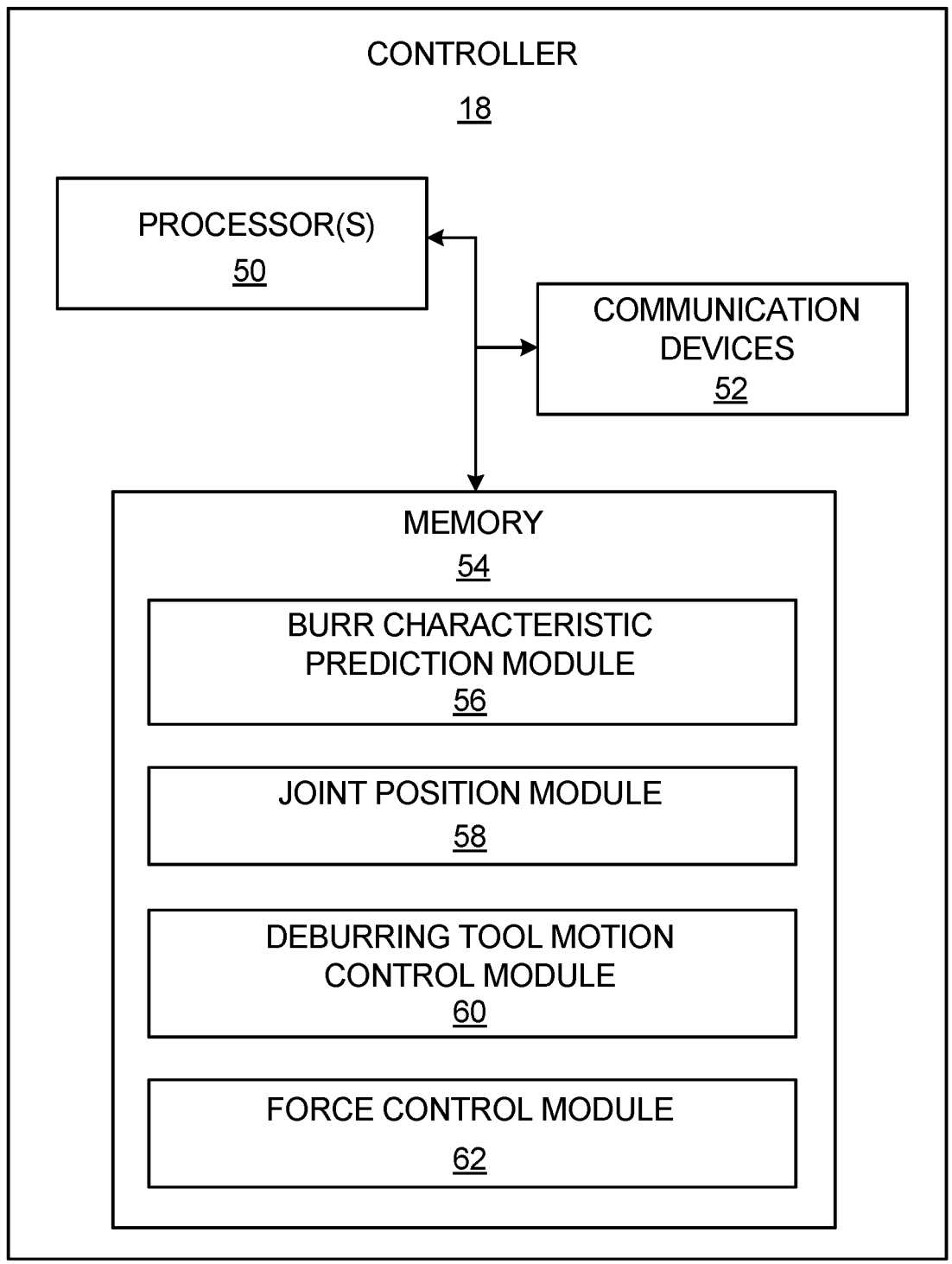
FIG. 3 is a block diagram of a controller used on the robotic deburring apparatus.

FIG. 3 is a block diagram of controller 18 which includes processor(s) 50, communications device(s) 52, and memory 54. In other embodiments, controller 18 can include more or fewer components than components 50, 52, and 54. Processor(s) 50, in one example, are configured to implement functionality and/or process instructions for execution within controller 18. For instance, processor(s) 50 can be capable of processing instructions stored in memory 54. Examples of processor(s) 50 can include any one or more of a microprocessor, a controller, a digital signal processor (DSP), an application specific integrated circuit (ASIC), a field-programmable gate array (FPGA), or other equivalent discrete or integrated logic circuity. Memory 54 can include process instructions/modules such as, but not limited to, burr characteristic prediction module 56, joint position module 58, deburring tool motion control module 60, and force control module 62.

Memory 54 can be configured to store information within controller 18 during operation. Memory 54, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 54 is a temporary memory, meaning that a primary purpose of memory 54 is not long-term storage. Memory 54, in some examples, is described as volatile memory, meaning that memory 54 does not maintain stored contents when power to controller 18 is turned off. Examples of volatile memories can include random access memories (RAM), dynamic random access memories (DRAM), static random access memories (SRAM), and other forms of volatile memories. In some examples, memory 54 is used to store program instructions for execution by processor(s) 50. Memory 54, in one example, is used by software or applications running on controller 18 to temporarily store information during program execution.

Memory 54, in some examples, also includes one or more computer-readable storage media. Memory 54 can be configured to store larger amounts of information than volatile memory. Memory 54 can further be configured for long-term storage of information. In some examples, memory 54 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Controller 18, in some examples, also includes communications device(s) 52. Controller 18, in one example, utilizes communication device(s) 52 to communicate with external devices via one or more networks, such as one or more wireless or wired networks or both. Communications device(s) 52 can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

Figure 4:
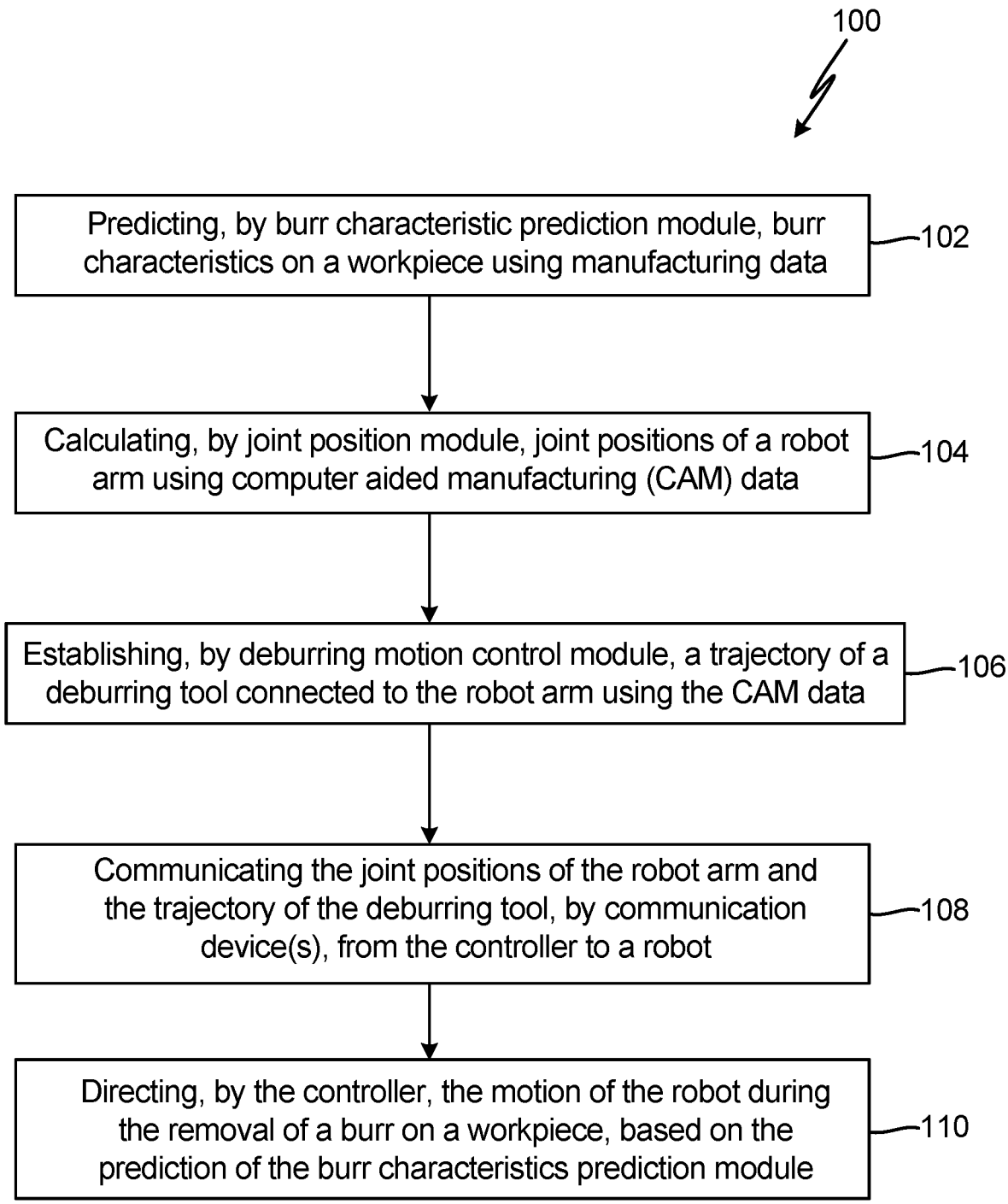
FIG. 4 is a flowchart of a method of operating the robotic deburring apparatus.

FIG. 4 is a flowchart of method 100 for operating robotic deburring apparatus 10. Step 102 includes predicting, by burr characteristic prediction module 56, burr characteristics on workpiece 28 using manufacturing data 26. Step 104 includes calculating, by joint position module 58, joint positions of robot arm 14 using computer aided manufacturing (CAM) data 24. Step 106 includes establishing, by deburring tool motion control module 60, a trajectory of deburring tool 16 connected to robot arm 14 using CAM data 24. Step 108 includes communicating the joint positions of robot arm 14 and the trajectory of deburring tool 16 by communication device(s) 52 from controller 18 to robot 12. Step 110 includes directing, by controller 18, the motion of robot 12 during the removal of burr 30 on workpiece 28, based on the burr characteristics predicted by burr characteristic prediction module 56.

As mentioned above, controller 18 has several functions, including but not limited to: predicting burr characteristics on workpiece 28 using manufacturing data 26; calculating joint positions of robot arm 14 using CAM data 24; establishing the trajectory of deburring tool 16 using CAM data 24; compensating for insufficient stiffness of robot arm 14 using feedback provided by force sensor data 22; communicating the joint positions of robot arm 14 to robot 12; communicating the trajectory of deburring tool 16 to robot 12; and directing the motion of robot 12 based on the predicted burr characteristics.

Controller 18 is configured to predict burr characteristics on workpiece 28 using manufacturing data 26 and burr characteristic prediction module 56. Controller 18 receives manufacturing data 26, processes manufacturing data 26 using burr characteristics prediction module 56, and outputs the predicted burr characteristics using communication device(s) 52. Specifically, controller 18 processes manufacturing data 26 by extracting geometrical material removal and contact area data, calculating machining cutting conditions, calculating cutting forces and cutting temperatures, and estimating burr characteristics for all contacted edges. The predicted burr characteristics include the predicted burr size, predicted burr type, and predicted burr location.

The predicted burr characteristics depend on a variety of factors including, but not limited to, the material of workpiece 28, the chip load during the machining and finishing of workpiece 28, and the properties of the coolant used during the machining and finishing of workpiece 28. Further, the predicted burr characteristics depend on the process parameters of the machining and finishing processes, the process parameters include: the machining tool cutting depth, machining tool cutting speed, machining tool feed rate, machining tool cutting force, machining tool material, machining tool geometry, and machining tool cutting temperature. The process parameters of the machining and finishing processes are gathered and recorded in memory 54 during the machining and finishing operations of workpiece 28. Further, controller 18 uses burr characteristic prediction module 56 to predict the burr characteristics for a variety of machining operations, including milling operations, drilling operations, turning operations, and broaching operations.

Controller 18 is configured to establish the trajectory of deburring tool 16 using CAM data 24 and deburring tool motion control module 60. CAM software is used to plan and control the machining and finishing processes for workpiece 28. The CAM software generates and stores CAM data 24 regarding the machining tool centerline trajectory and the machining tool location history during the machining and finishing operations for workpiece 28. Controller 18 uses the stored machining tool centerline trajectory and location history to establish the trajectory of deburring tool 16. CAM data 24 includes data that indicates the location of the perimeter of workpiece 28. Burrs 30 will be formed around the perimeter of workpiece 28. Therefore, deburring tool 16 needs to follow the perimeter of workpiece 28 to remove burrs 30 on workpiece 28. Thus, deburring tool 16 will follow the same path/trajectory that was used during the machining and finishing operations for workpiece 28 to remove burrs 30 on the perimeter of workpiece 28. In previous approaches to using robots to remove burrs, an expert was needed to program a machine to follow a perimeter of a workpiece to remove the burr. This was a time consuming, expert dependent, and complex process. Here, CAM data 24 used during the machining and finishing operations is reused to indicate the perimeter of workpiece 28 and deburring tool motion control module 60 establishes the trajectory of deburring tool 16.

Controller 18 is also configured to calculate the joint positions of robot arm 14 using CAM data 24 and joint position module 58. As discussed above, the CAM software generates and stores CAM data 24 regarding the machining tool centerline trajectory and the machining tool location history during the machining and finishing operations for workpiece 28. Therefore, CAM data 24 includes data regarding the perimeter of workpiece 28 and the trajectory of deburring tool 16. With the trajectory of the deburring tool known, controller 18 is configured to calculate, using joint position module 58, the joint positions of robot arm 14 that allow deburring tool 16 to reach every edge of workpiece 28. Joint position module 58 calculates the joint positions of robot arm 14 using reverse kinematics to determine the necessary movements of robot arm 14 that allow deburring tool 16 to reach each and every edge of workpiece 28 without contacting and damaging workpiece 28 in a location that was not intended to be contacted.

Controller 18 calculates the joint positions of robot arm 14 to achieve a properly deburred workpiece 28 without contacting workpiece 28 in a damaging manner.

Controller 18 is configured to use manufacturing data 26 and CAM data 24 to determine the trajectory of deburring tool 16, speed of deburring tool 16, and feed rate of deburring tool 16. As discussed above, CAM data 24 is used to establish the trajectory of deburring tool 16. Further, as discussed above, manufacturing data 26 is used to predict the burr characteristics for all edges of workpiece 28. Using the trajectory of deburring tool 16 and the predicted burr characteristics, controller 18 is able to optimize the deburring process parameters. Specifically, controller 18 uses deburring tool motion control module 60 to establish the speed of deburring tool 16 and the feed rates of deburring tool 16 required to remove burr 30 from workpiece 28. The required speed of deburring tool 16 and the feed rate of deburring tool 16 depends on the size and type of burr 30 on workpiece 28. Each type of burr 30 requires different deburring process parameters to remove burr 30 in an efficient manner. Therefore, the predicted burr characteristics allows controller 18 to determine the appropriate deburring process parameters required to remove burr 30.

Controller 18 is configured to communicate to robot 12, using communication device(s) 52, the joint positions of robot arm 14, the trajectory of deburring tool 16, the speed of deburring tool 16, and the feed rates of deburring tool 16. After the information has been communicated from controller 18 to robot 12, controller 18 directs the motion of robot 12 and the operation of deburring tool 16 during the deburring process. Robot 12 uses the joint positions of robot arm 14, the trajectory of deburring tool 16, the speed of deburring tool 16, and the feed rates of deburring tool 16 to control robot arm 14 and complete the deburring process.

Controller 18 is further configured to compensate for insufficient stiffness of robot arm 14 using force sensor data 22 from force sensors 20 and force control module 62. When the stiffness of robot arm 14 is insufficient, robot arm 14 will deflect when being pressed against workpiece 28, resulting in less force being applied to workpiece 28 than intended. When this occurs, the force being applied to workpiece 28 may be low enough that burr 30 will not be removed. Therefore, force sensors 20 are attached to robot arm 14 and provide real-time force sensor data 22 regarding the movements and forces exerted by robot arm 14. Force sensor data 22 is communicated to robot 12, which then communicates force sensor data 22 to controller 18. Controller 18 receives, stores, and processes force sensor data 22 to determine if the proper amount of force is being applied to workpiece 28 to remove burr 30. If the force being applied to workpiece 28 is sufficient to remove burr 30, controller 18 will send a communication using, communication device(s) 52, to robot 12 indicating robot 12 should maintain the force being applied by robot arm 14. If the force being applied to workpiece 28 is insufficient to remove burr 30, controller 18 will send a communication, using communication device(s) 52, to robot 12 indicating robot 12 should increase the force being applied by robot arm 14. Further, if robot arm 14 deflects when being pressed against workpiece 28, deburring tool 16 is likely not in its intended orientation/angle for removing burr 30 from workpiece 28. Force control module 62 further processes force sensor data 22 from force sensors 20 to verify and adjust the orientation/angle of deburring tool 16 to achieve proper removal of burr 30 from workpiece 28. Controller 18 uses force sensor data 22 from force sensors 20 to verify the appropriate process parameters are being achieved during the deburring process.

Robotic deburring apparatus 10 and method 100 for operating robotic deburring apparatus 10 result in an automatic deburring process that is no longer time consuming, expert dependent, and requires complex programming. Further, robotic deburring apparatus 10 and method 100 for operating robotic deburring apparatus 10 eliminate the need for complicated operator training for deburring programming and expert knowledge of deburring process planning. Robotic deburring apparatus 10 and method 100 ensure efficient removal of burrs 30 from workpiece 28 while improving quality and reliability of the deburring process.

Discussion of Possible Embodiments

The following are non-exclusive descriptions of possible embodiments of the present invention.

A deburring apparatus includes a robot including a robot arm, a deburring tool attached to the robot arm, a plurality of force sensors attached to the robot arm, and a controller in data communication with the robot. The controller is configured to predict burr characteristics on a workpiece using manufacturing data, calculate joint positions of the robot arm using computer aided manufacturing (CAM) data, and establish the deburring tool trajectory using the CAM data. Further, the controller communicates the joint positions of the robot arm and the deburring tool trajectory to the robot and the controller directs the motion of the robot during the removal of a burr on the workpiece, based on the prediction of the burr characteristics.

The deburring apparatus of the preceding paragraph can optionally include, additionally and/or alternatively, any one or more of the following features, configurations and/or additional components:

The controller is further configured to use force sensor data from the force sensors to compensate for insufficient stiffness of the robot arm during a deburring process.

The controller compensates for insufficient stiffness of the robot arm by providing commands to the robot to adjust a force exerted by the robot arm and orientation or angle of the deburring tool during the deburring process.

The CAM data includes a machining tool centerline trajectory or machining tool location history.

The CAM data is data previously used to manufacture the workpiece.

The predicted burr characteristics include predicted burr size, predicted burr type, and predicted burr location.

The manufacturing data includes at least one of the workpiece material, chip load, coolant properties, machining tool cutting depth, machining tool cutting speed, machining tool feed rate, machining tool cutting force, machining tool material, machining tool geometry, and machining tool cutting temperature.

The manufacturing data is gathered during a machining and a finishing operation of the workpiece.

The controller directs the motion of the robot and operation of the deburring tool by using the manufacturing data and CAM data to determine the deburring tool trajectory, deburring tool speed, and deburring tool feed rate during a deburring process.

The predicted burr type is one of a Poisson burr, a roll-over burr, a tear burr, or a cut-off burr.

A method for controlling a robotic deburring process, the method comprising predicting, by a controller, burr characteristics on a workpiece using manufacturing data. Calculating, by the controller, joint positions of a robot arm using computer aided manufacturing (CAM) data. Establishing, by the controller, a trajectory of a deburring tool connected to the robot arm using the CAM data. Communicating the joint positions of the robot arm and the trajectory of the deburring tool from the controller to a robot. Directing, by the controller, the motion of the robot during the removal of a burr on a workpiece, based on the predicted burr characteristics.

The method of the preceding paragraph can optionally include, additionally and/or alternatively, any one or more of the following features, configurations and/or additional components:

Utilizing force sensor data from a plurality of force sensors attached to the robot arm to compensate for insufficient stiffness of the robot arm.

Compensating for insufficient stiffness of the robot arm includes providing commands from the controller to the robot to adjust a force exerted by the robot arm and orientation or angle of the deburring tool during the deburring process.

The CAM data includes a machining tool centerline trajectory or machining tool location history.

The CAM data is data previously used to manufacture the workpiece.

The predicted burr characteristics include predicted burr size, predicted burr type, and predicted burr location.

The manufacturing data includes at least one of the workpiece material, chip load, coolant properties, machining tool cutting depth, machining tool cutting speed, machining tool feed rate, machining tool cutting force, machining tool material, machining tool geometry, and machining tool cutting temperature.

The manufacturing data is gathered during a machining and a finishing operation of the workpiece.

Directing, by the controller, the motion of the robot and operation of the deburring tool by using the manufacturing data and CAM data to determine the deburring tool trajectory, deburring tool speed, and deburring tool feed rate during a deburring process.

The predicted burr type is one of a Poisson burr, a roll-over burr, a tear burr, or a cut-off burr.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A deburring apparatus comprising:
  a robot including a robot arm;
  a deburring tool attached to the robot arm;
  a plurality of force sensors attached to the robot arm; and
  a controller in data communication with the robot, the controller being configured to:
    predict burr characteristics on a workpiece using manufacturing data, wherein the manufacturing data includes at least one of the workpiece material, chip load, coolant properties, machining tool cutting depth, machining tool cutting speed, machining tool feed rate, machining tool cutting force, machining tool material, machining tool geometry, and machining tool cutting temperature;
    calculate joint positions of the robot arm using computer aided manufacturing (CAM) data and communicate the joint positions of the robot arm to the robot;
    establish the deburring tool trajectory using the CAM data and communicate the deburring tool trajectory to the robot;
    direct the motion of the robot during the removal of a burr on the workpiece, based on the CAM data; and
    establish and control a speed of the deburring tool and feed rate of the deburring tool, based on the predicted burr characteristics;
  wherein the controller automatically predicts burr characteristics on the workpiece immediately after completion of machining and finishing of the workpiece.

2. The deburring apparatus of claim 1, wherein the controller is further configured to use force sensor data from the force sensors to compensate for insufficient stiffness of the robot arm during a deburring process.

3. The deburring apparatus of claim 2, wherein the controller compensates for insufficient stiffness of the robot arm by providing commands to the robot to adjust a force exerted by the robot arm and orientation or angle of the deburring tool during the deburring process.

4. The deburring apparatus of claim 1, wherein the CAM data includes a machining tool centerline trajectory or machining tool location history.

5. The deburring apparatus of claim 4, wherein the CAM data is data previously used to manufacture the workpiece.

6. The deburring apparatus of claim 1, wherein the predicted burr characteristics include predicted burr size, predicted burr type, and predicted burr location.

7. The deburring apparatus of claim 1, wherein the controller predicts burr characteristics on a workpiece by extracting geometrical material removal and contact area data, calculating machining cutting conditions, calculating cutting forces and cutting temperatures, and estimating burr characteristics for all contacted edges of the workpiece.

8. The deburring apparatus of claim 7, wherein the manufacturing data is gathered during a machining and a finishing operation of the workpiece.

9. The deburring apparatus of claim 1, wherein the controller directs the motion of the robot and operation of the deburring tool by using the manufacturing data and CAM data to determine the deburring tool trajectory, deburring tool speed, and deburring tool feed rate during a deburring process.

10. The deburring apparatus of claim 6, wherein the predicted burr type is one of a Poisson burr, a roll-over burr, a tear burr, or a cut-off burr.

11. A method for controlling a robotic deburring process, the method comprising:
  predicting, by a controller, burr characteristics on a workpiece using manufacturing data, wherein the manufacturing data includes at least one of the workpiece material, chip load, coolant properties, machining tool cutting depth, machining tool cutting speed, machining tool feed rate, machining tool cutting force, machining tool material, machining tool geometry, and machining tool cutting temperature;
  calculating, by the controller, joint positions of a robot arm using computer aided manufacturing (CAM) data and communicating, by the controller, the joint positions of the robot arm to the robot;
  establishing, by the controller, a trajectory of a deburring tool connected to the robot arm using the CAM data and communicating, by the controller, the deburring tool trajectory to the robot;

directing, by the controller, the motion of the robot during the removal of a burr on a workpiece, based on the CAM data; and establishing and controlling, by the controller, a speed of the deburring tool and a feed rate of the deburring tool, based on the predicted burr characteristics;

wherein the controller automatically predicts burr characteristics on the workpiece immediately after completion of machining and finishing of the workpiece.

12. The method of claim 11 and further comprising utilizing force sensor data from a plurality of force sensors attached to the robot arm to compensate for insufficient stiffness of the robot arm.

13. The method of claim 12, wherein compensating for insufficient stiffness of the robot arm includes providing commands from the controller to the robot to adjust a force exerted by the robot arm and orientation or angle of the deburring tool during the deburring process.

14. The method of claim 11, wherein the CAM data includes a machining tool centerline trajectory or machining tool location history.

15. The method of claim 14, wherein the CAM data is data previously used to manufacture the workpiece.

16. The method of claim 11, wherein the predicted burr characteristics include predicted burr size, predicted burr type, and predicted burr location.

17. The method of claim 11, wherein the controller predicts burr characteristics on a workpiece by extracting geometrical material removal and contact area data, calculating machining cutting conditions, calculating cutting forces and cutting temperatures, and estimating burr characteristics for all contacted edges of the workpiece.

18. The method of claim 17, wherein the manufacturing data is gathered during a machining and a finishing operation of the workpiece.

19. The method of claim 11 and further comprising directing, by the controller, the motion of the robot and operation of the deburring tool by using the manufacturing data and CAM data to determine the deburring tool trajectory, deburring tool speed, and deburring tool feed rate during a deburring process.

20. The method of claim 16, wherein the predicted burr type is one of a Poisson burr, a roll-over burr, a tear burr, or a cut-off burr.

* * * * *